Sept. 2, 1958  H. FREEMAN ET AL  2,849,930
METHOD AND APPARATUS FOR TREATING PULP SUSPENSIONS
AND OTHER FLUIDS FOR REMOVAL OF UNDESIRED
PARTICLES AND GASES
Filed Dec. 6, 1952  4 Sheets-Sheet 2
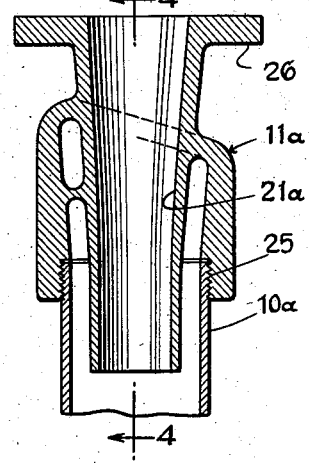
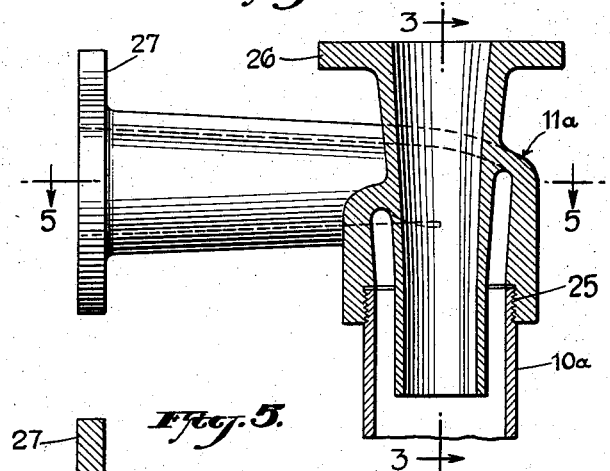
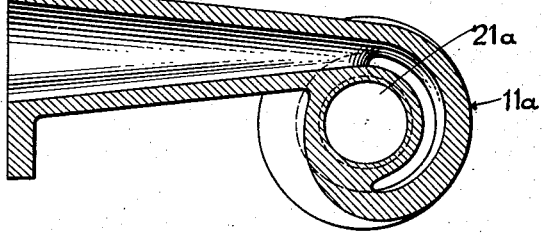
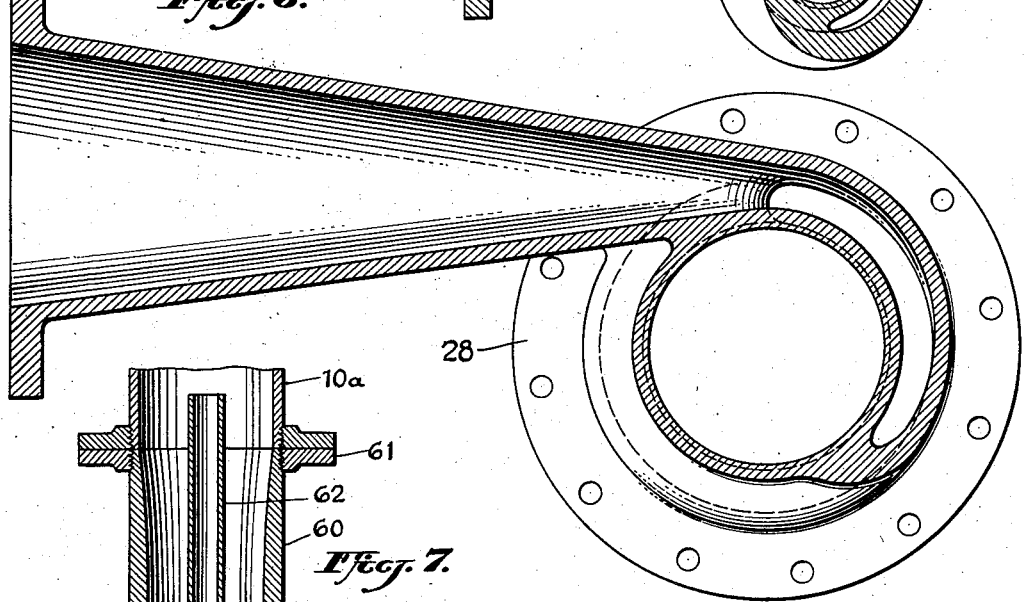
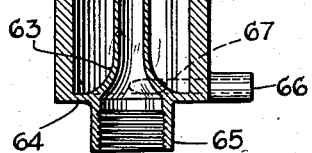
INVENTORS.
HORACE FREEMAN.
BY JOHN D. BOADWAY.
Ward, Crosby + Neal
ATTORNEYS.

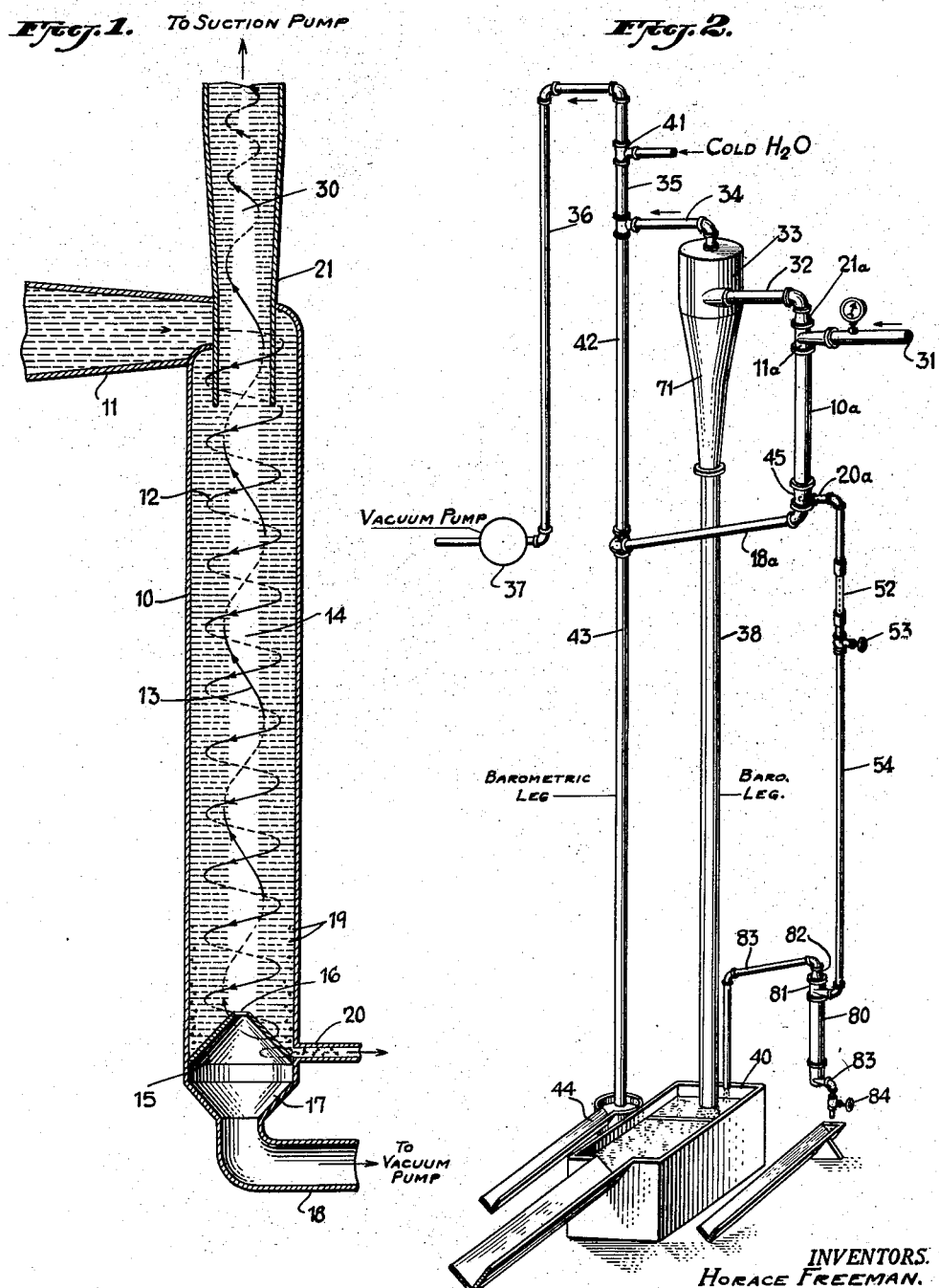

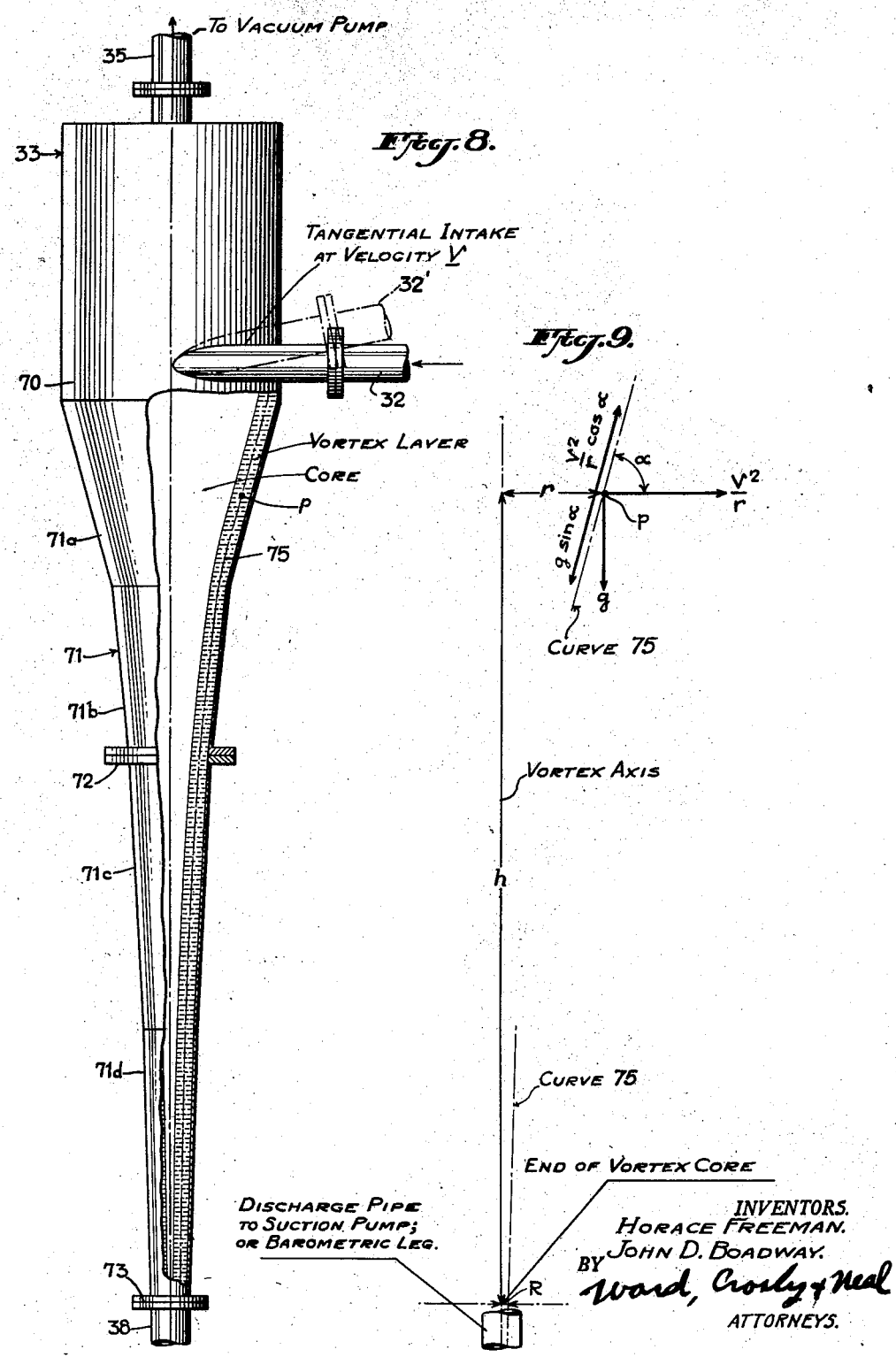

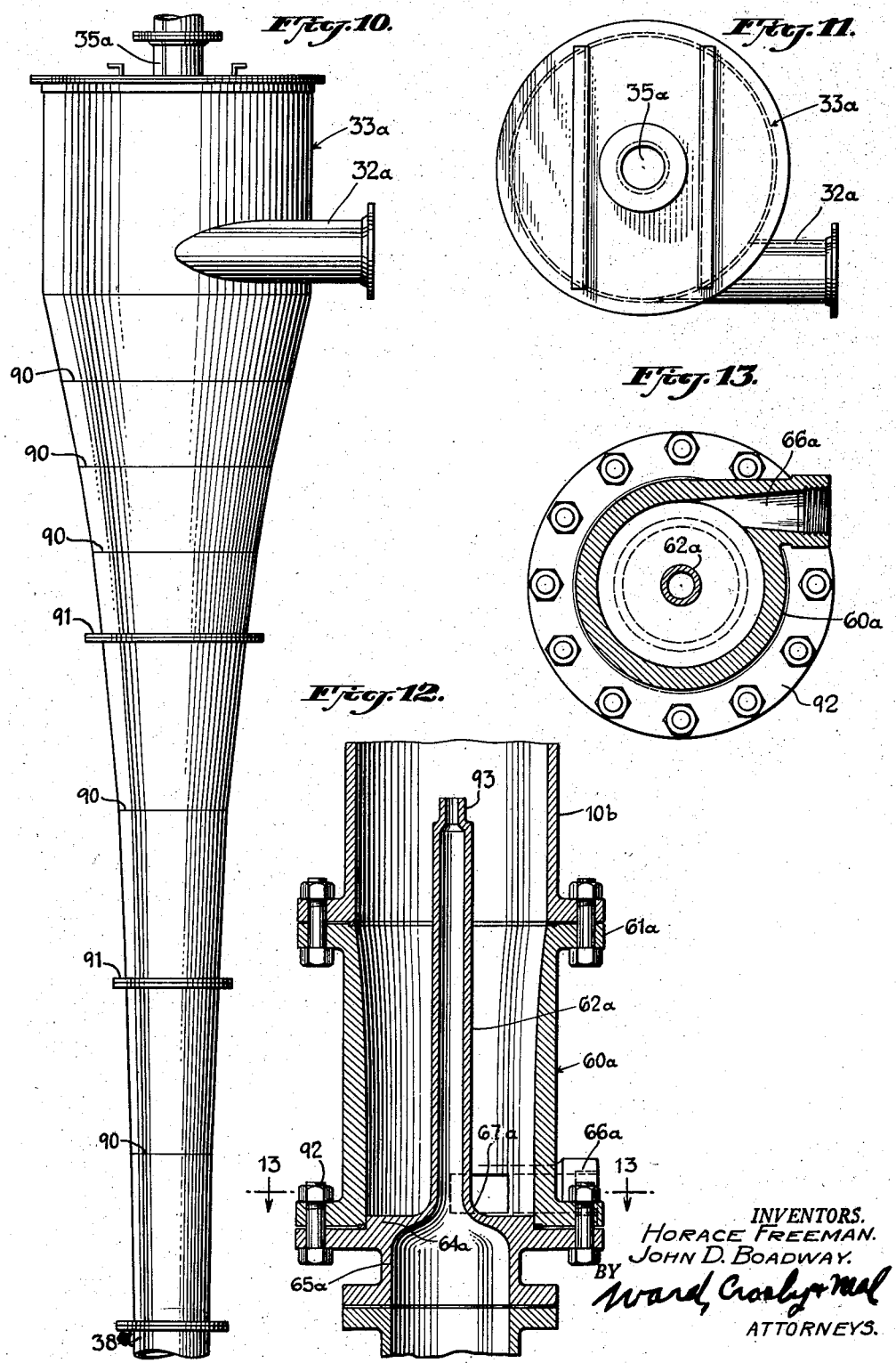

2,849,930

METHOD AND APPARATUS FOR TREATING PULP SUSPENSIONS AND OTHER FLUIDS FOR REMOVAL OF UNDESIRED PARTICLES AND GASES

Horace Freeman, Cap-de-la-Madeleine, Quebec, and John D. Boadway, Three Rivers, Quebec, Canada, assignors, by mesne assignments, to Nichols Engineering and Research Corporation, New York, N. Y., a corporation of Delaware Application December 6, 1952, Serial No. 324,561

Claims priority, application Canada September 24, 1952

5 Claims. (Cl. 92—28)

This invention relates to methods and apparatus for separating gases and vapor and also, if desired, solid particles such as dirt from liquids and liquid suspensions, the invention among various other possible uses being particularly adapted for the treatment of paper pulp suspensions.

Pulp suspensions as supplied to paper making machines ordinarily include considerable gas and vapor, including air, carbon dioxide and water vapor, the gases being partially dissolved in the liquid, partially adsorbed or occluded in the fibre, and partially within bubbles of froth on the surface of the mixture and other bubbles clinging to the particles of wood fibre throughout the mixture and causing the fibres to flocculate and accumulate excessively adjacent the surface of the mixture. Such gases in typical cases may amount to 3% by volume of the pulp mixture at the paper making machine headbox. Such bubbles in a typical case, comprise about 10% of the gas content of the pulp. For some time it has been appreciated that substantial benefits will accrue if these bubbles, as well as the dissolved and occluded gases, are removed before the mixture is supplied to paper making machines. These benefits include the elimination of troublesome foam in the head box, increasing the drainage rate, reduction of the drying time required for the paper as well as improvements in its formation and quality, reduction of the number of breakages of paper on the machine, reduction of the sulfite content required, and include a general increase in the efficiency of the paper making machines by several percent, representing a great saving to the industry, as well as improving the quality and uniformity of the paper produced. Heretofore it has been proposed to remove such gases from paper stock by application of a vacuum to the Jordans used in treating the pulp, but for various reasons this proposal, so far as is known, has not been found successful or expedient for any extensive use. More recently apparatus has been devised for spraying the paper stock against baffle plates in a vacuum tank to remove the gases by the combined effect of boiling under vacuum and impingement, but the required equipment for this purpose is complex, bulky and requires very heavy capital expenditures and an excessive operating or maintenance cost. Furthermore such equipment removes no more than about 70% of the gases.

The present invention on the other hand makes possible an efficient, relatively inexpensive method and apparatus for removing such gases and vapors from paper stock or other liquids or suspensions, while at the same time, if desired, efficiently removing dirt or other undesired solid particles from the liquid, thus accomplishing two purposes concurrently with the same relatively simple apparatus. Preferably the apparatus, although it may take other forms, is of a general type constituting a modification of and an improvement over the vortex-type separator for separating solid particles from fluids, as disclosed in U. S. Patent to Horace Freeman, No. 2,102,525, granted December 14, 1937.

Briefly the method in its broader aspects comprises maintaining a high velocity vortex of the liquid or liquid mixture to be treated, surrounding a core of gas which is maintained at low sub-atmospheric pressure by continuously exhausting gas therefrom at a rate sufficient also to maintain the inner portions of the liquid of the vortex under sub-atmospheric pressure, whereby dissolved gases and any occluded gases in such inner portions are liberated and the resulting bubbles of liberated gas and any bubbles originally present are flung by the action of the centrifugal force of the vortex into the core, while concurrently, if the mixture contains any heavier particles desired to be separated, these are flung to the outer portions of the vortex and may there be withdrawn or discharged in a stream comprising a small portion of the mixture while the desired treated liquid is being separately withdrawn at a suitable point after it has been subjected to the vortex action.

Another important aspect of the preferred embodiment of the invention involves the maintenance of the vortex in a reversing form, i. e. after the liquid of the vortex has followed a helical path for a considerable distance in one direction as an outer vortex, the helical path is caused to reverse its direction of progress so that the liquid then forms an inner smaller return vortex which encloses the evacuated core and is thus subject to the sub-atmospheric pressure for a considerable distance while being surrounded by the outer vortex. With this embodiment, if the mixture contains any heavier particles desired to be separated, these may be conveniently taken from the periphery of the outer vortex near the reversing point, the treated liquid being withdrawn from the end of the inner vortex opposite the point of reversal and the gas being exhausted from the core at either one or both ends thereof. This embodiment is believed to be particularly effective for the separation of gases from mixtures of the nature of pulp suspensions because of a shearing effect or the like, to which the outer vortex subjects the suspension of the inner vortex, thereby causing bubbles which are tenaciously clinging to the fiber or are enveloped thereby to be dislodged, and also for the reason that the relatively thin tubular layer of liquid forming the inner vortex, is for an extended distance subjected to the low sub-atmospheric pressure of the core, as is necessary effectively to liberate the dissolved and occluded gases.

Preferably, although not necessarily, the stock to be treated is introduced tangentially at one end of a vortex chamber in a manner to cause the helical flow or vortex to extend along the chamber walls to the other end thereof, the flow then reversing and forming the inner returning vortex surrounding the evacuated core and extending back to a concentric stock outlet at the first end of the chamber. If dirt or undesired particles are to be removed, the small quantity of the stock containing same is allowed to escape or is withdrawn from a point at or close to the wall of the chamber and at a location spaced substantially from the stock inlet.

While the form of the invention herein specifically disclosed is particularly adapted for treating paper pulp suspensions, it will be understood that the invention is also well adapted for treating a variety of other liquids and liquid mixtures, for example for the removal of gases and vapors and undesired particles from water or oil, the treatment of various ore suspensions and the treatment of many types of liquid chemical mixtures from which it is important to remove dissolved and occluded gases and bubbles as well as particles of impurities, if desired.

Various further and more specific objects, features and advantages of the invention will appear from the detailed description given below taken in connection with the accompanying drawings which form a part of this specification and illustrate merely by way of example, preferred forms of apparatus for the practice of the invention. The invention consists in such novel features, arrangements and combinations of parts and method steps as may be shown and described herein.

In the drawings:

Fig. 1 is a somewhat schematic vertical sectional view of one form of the main separating device for use in accordance with the invention;

Fig. 2 is a perspective view showing the exterior of such a device in its preferred form, together with a preferred arrangement of accompanying apparatus and connections therefor;

Fig. 3 is a vertical sectional view drawn to scale, of a preferred form of headpiece used on the main separating device;

Fig. 4 is a sectional view taken substantially along line 4—4 of Fig. 3;

Fig. 5 is a sectional view taken substantially along line 5—5 of Fig. 4;

Fig. 6 is a sectional view also drawn to scale, similar to Fig. 5 but showing a somewhat modified form of headpiece;

Fig. 7 is a vertical sectional view showing in detail a preferred form of lower end piece for the main vortex separators embodying the invention;

Fig. 8 is an enlarged view partly in section of a device forming a part of the assembly shown in Fig. 2 for removing such bubbles and gas from the treated stock as are not fully removed in the main separating device;

Fig. 9 is a diagram for illustrating the action which takes place in the device of Fig. 8;

Fig. 10 is a view of a device like that of Fig. 8 but with slight modifications appropriate because of its larger size;

Fig. 11 is a top view of the device of Fig. 10;

Fig. 12 is a vertical sectional view of an alternative bottom portion for the main vortex chamber; and Fig. 13 is a sectional view taken substantially along line 13—13 of Fig. 12.

Referring now to Fig. 1 in further detail, the separating device for practicing the invention as here shown somewhat schematically, comprises an elongated chamber 10 of circular cross-section and preferably, although not necessarily, of a cylindrical shape at least in its main body portions. This chamber should preferably be of a length many times its diameter, especially if the apparatus and method are to be used for separating dirt and other solid particles, as well as gases, from the liquid. In a typical case, for example, where the internal diameter of the chamber was four inches, its length, apart from the top and bottom portions, was fifty inches. It should be here noted that while in the drawings this separator chamber is shown in vertical position, and as thus shown, the intake end is for convenience herein referred to as the upper end, it will be understood that the device, if desired, may actually be mounted to extend horizontally or at any angle to the vertical or even in inverted position. The centrifugal forces within the liquid in the device are so great that the effect of gravity on the operating conditions in this chamber is substantially immaterial if, as sometimes may be convenient for the saving of headroom, the chamber is mounted in horizontal position or some other angle to the vertical.

At the upper end of the chamber an intake opening 11 is provided in a position to inject the stock to be treated generally tangentially into the chamber in a manner to cause a helical flow of the liquid mixture (as indicated by the helix 12) downwardly along the inside walls of the chamber to the region at or adjacent the lower end thereof, the helical flow or vortex, with the preferred forms of the invention here shown, then reversing and forming an inner upwardly moving vortex (as indicated by the helix 13) surrounding a substantially evacuated central core 14 which is free or substantially uniformly free of liquid. In the particular form as here shown in Fig. 1, the lower end of the chamber contains an upright, generally conical diaphragm or partition 15 having a central gas outlet 16 at its apex located in the core 14, and communicating with the space 17 beneath the cone, to which space, by a conduit 18, a means such as a vacuum pump is connected for constantly evacuating gases and vapor from the core region 14, thus also subjecting the tubular layer of swirling liquid forming the inner vortex 13, to a sub-atmospheric pressure throughout its length.

Any dirt or other solid particles heavier than the liquid will tend strongly to be forced radially outwardly in the helical flow toward the interior wall surfaces of the chamber, and as indicated at 19, toward the lower portions of the chamber, such particles will have accumulated along the wall surfaces and will be carried down therealong to the periphery of the cone 15 and may be there discharged in any suitable way, preferably along with a small percentage of the liquid which is there under pressure, through a small tangentially connected conduit 20.

The treated stock embodied largely within the upwardly flowing inner vortex, is preferably removed through a concentrically located outlet conduit 21, which may be connected to a suction pump as indicated, or to some equivalent device, for the purpose of withdrawing the stock from the region surrounding the evacuated core. For example, as hereinafter explained in connection with Fig. 2, the outlet conduit may have suitable connections to utilize the same source of vacuum as applied to the gas outlet 18.

Heretofore the most common commercially used vortex type separators for separating dirt from pulp suspensions have been such that little or no core region containing gas occurs in the vortices, any such core as may be present being too small and irregular to permit evacuation of gas therefrom to maintain a sub-atmospheric pressure therein. In order to secure the formation of a core region free of liquid, symmetrical, and of substantial size as indicated in Fig. 1, it is important to inject the liquid with substantial velocity, for example in typical cases, at 50 or more feet per second. For this purpose the inlet connection 11 at or closely adjacent the region where it enters the top of the chamber 10, should be substantially restricted as compared with the cross-sectional area of the introduced stream at preceding points. Such restriction has the effect of converting a substantial portion of the pressure energy (pressure head) of the introduced stream into kinetic energy (velocity head) thereby imparting sufficient velocity to the liquid of the vortices in the chamber to permit maintenance of the evacuated core and at the same time greatly enchancing the sedimentation efficiency in the vortices, since such efficiency varies as the square of the velocity and inversely as the quantity of the flow. One might think it desirable by suitably restricting the inlet, to convert substantially all of the pressure energy into velocity energy in order greatly to improve the separating efficiency, and in fact this has heretofore been proposed in connection with vortex type dirt separators for pulp suspensions. Yet this is a fallacy, because if substantially all of the pressure energy should be converted to velocity energy, then there would be no sufficient depth of liquid in the vortex on the wall of the chamber to permit in practice, proper separation and withdrawal of the dirt particles. In designing the inlet for the purposes of the present invention, its restriction should preferably be gradual to insure a smooth flow of liquid and just sufficient to cause formation in the chamber of the central core free of liquid (while the core is under vacuum) and large enough to permit the gas to be separately evacuated therefrom, but not so large as to prevent the liquid of the upward inner vortex from being withdrawn through an outlet as at 21 of appropriate size to be received within the outer vortex. For example, if the chamber 10 has a diameter of four inches, and a stream three inches in diameter is being supplied, the central gas core may desirably have a diameter of about one and one-half inches, and to accomplish this result, the most restricted point at the inlet was about two inches by three-quarters of an inch in size and such that the ratio of the incoming pressure head to the resulting velocity head is equal to a ratio of about 1.12 to 1.0. The inside diameter of the inner end of the outlet 21 may then conveniently be about 2.25 inches (or of an area about twice the cross-sectional area of the core) and the gas outlet 16 may conveniently be made about three-quarters of an inch in diameter. As another example, where the inside diameter of the chamber 10 was ten inches and the inside diameter of the conduit leading up to the apparatus was eight inches, the most restricted point in the head portion was about five and five-eights inches by one and three-eights inches in size and such that about 50% of the incoming pressure energy was converted to velocity energy. It is believed that the generally practical and feasible limits for such percentages may vary from about 40 to 60% with a separator device having outlets arranged generally as shown in Fig. 1.

It should be here noted that within quite wide limits at least, the pressure at which the stock is fed to the intake has very little effect upon the size of the evacuated core. Thus for the examples above, while the pulp suspension was supplied at a pressure of about 25 lbs. per square inch, the pressure might, if desired, vary considerably from this value. As may be shown mathematically, there will be compensating factors causing the core to remain of suitable size while the liquid supply pressure is raised or lowered within rather wide limits. That is, if the supply pressure is higher, tending to fill in the evacuated core, then the velocity of the liquid will be correspondingly higher, tending to increase the size of the core; and conversely, if the pressure is lower, tending to increase the size of the core, the velocity will be correspondingly lower, tending to reduce the size of the core. For best results, however, the gradual shaping of the inlet restriction and the degree to which such restriction is made should be carefully determined. Figs. 3 to 5 which are drawn to scale, show the cavities properly shaped for accomplishing the energy conversion in the ratio of 1.12 to 1.0 of the example first above given, and with a three-inch inlet pipe connection and a four inch separating chamber. Fig. 6 (also drawn to scale) corresponds to Fig. 5, but shows the cavities properly shaped for accomplishnig conversion of about 50% of the incoming energy to velocity energy for a chamber ten inches in diameter and a supply pipe eight inches in diameter.

As shown in Figs. 3–5, the headpiece or inlet member 11a may comprise a casting having threaded engagement as at 25 with the upper end of the chamber 10a, such chamber being conveniently formed of a length of pipe of the desired diameter. As will be noted, the casting 11a may be formed integrally with the stock outlet portion 21a and the upper end of this outlet may be shaped to provide for a flanged connection at 26 with piping leading to a vacuum pump or other means hereinafter described. Also the inlet connection may be formed with a flange 27 for connection with the intake pipe. Except for its size and the slightly different shape of the intake cavity therein, the headpiece of Fig. 6 may be made like that of Figs. 3–5, although as shown in Fig. 6, a flange 28 is provided and adapted for making a flanged connection to the separating chamber.

As shown in Figs. 1, 3 and 4, the outlet connection (21 or 21a) is preferably so shaped that as the flow of liquid passes therethrough, it will become gradually somewhat larger in diameter. At this region the initial velocity energy of the vortices will have decreased somewhat because of friction and by expanding somewhat the cross-section of the outlet stream, some of the velocity energy will be reconverted to pressure energy. For these reasons the diameter of the evacuated core will tend rapidly to diminish as indicated at 30 (Fig. 1) in the outlet stream, although in the usual case some gas may be evacuated along with the treated stock in the outlet stream, and in that event such gas may be separated from the liquid in the manner hereinafter explained in connection with Figs. 2 and 8. If the bottom gas outlet is closed, then all of the gas withdrawn may be taken out through outlet 21.

In this arrangement of Fig. 2, the separating chamber as indicated at 10a has a headpiece 11a to which an inlet pipe 31 is connected for feeding in the stock to be treated from any suitable form of pumping means or the equivalent (not shown). The outlet 21a for the treated stock is connected by a pipe 32 located and connected with a separating chamber 33 in a manner to direct the withdrawn stock and and gases and vapor which may be withdrawn therewith tangentially into this chamber. The upper end of this chamber is connected as by pipes 34, 35 and 36 to a vacuum pump 37. The lower end of chamber 33 in the example shown communicates with the upper end of a pipe 38 extending downward for a vertical distance of over 32 feet, thus comprising a so-called "barometric leg," the lower end of which discharges into a treated pulp suspension receiving box or trough means as at 40, which, if desired, might comprise the headbox of a paper making machine.

The withdrawn stock will be projected by pipe 32 into the chamber 33 and keep this chamber partially filled by a vortex in the manner explained below in further detail, and any gases and vapors existing in the upper part of the chamber 33, will be drawn off by the vacuum pump 37 and thus promptly removed from the presence of the treated stock.

The paper pulp suspension as introduced into the chamber 10a in a typical case may be at a temperature of about 100° F., although in other cases practice in the mill may be such that the temperature is lower, or as high as 130° F. The vacuum pump 37 should preferably be sufficiently large and effective as to reduce the pressure within the evacuated core in the chamber 10a to a value about equal to or lower than the vapor pressure of the liquid at the temperature at which the latter is being treated (4–8 cms. Hg absolute, in typical cases). Whether or not any substantial amount of gas is withdrawn along with the treated liquid and discharged into the chamber 33, there will at least be vapor in the upper part of this chamber, but such vapor will be constantly evacuated through pipe 35, and the barometric leg 38 will, of course, make possible the continuous maintenance of the vacuum condition in the upper part of the chamber 33. However, to prevent the vapor and any foam or spray from reaching the vauum pump and interfering with its efficient operation, the vapor is preferably condensed by introducing a spray of cold water into the pipe 35 at a fixture 41. The condensed vapor and introduced water flow down through pipes 35 and 42 into another barometric leg 43 discharging at the bottom into trough means or the like 44.

The lower end of the main separating chamber 10a is provided with a fixture 45 which may either be constructed substantially the same as indicated at the bottom of Fig. 1, or preferably in accordance with the modification hereinafter described. In either event, the gas outlet connection 18a is connected into pipe 42, above the effective upper end of barometric leg 43. Thus gases and vapors withdrawn from the lower end of chamber 10a are conducted up into pipe 35 along with the gases and vapors coming from the upper part of chamber 33. It will be apparent that the connection of the same source of vacuum to both the upper and lower outlets of the chamber 10a provides a convenient means for insuring stabilized conditions in this chamber without the necessity of regulating the suction at one end to prevent its interference with uniform withdrawal of fluid at the other end.

Any vapor which tends to condense in the gas outlet pipe 18a will be discharged into the barometric leg 43.

The dirt and other undesired solid particles are discharged from the fitting 45 at the bottom of chamber 10a through a pipe 20a made of suitable size to discharge, preferably tangentially, sufficient liquid along with the particles to insure that this pipe will not become clogged. This pipe may have a sight-glass 52 and a valve 53 connected therein and may also discharge through a barometric leg 54. However, such a barometric leg at this point is not essential since the liquid carrying the rejected particles will ordinarily emerge under a pressure of about 5 lbs. per square inch. The rate of flow of the rejected material may, of course, be regulated by adjusting the valve 53. The material rejected through pipe 20a may be retreated to recover further useful stock therefrom by passing the same through secondary vortex separators, as disclosed in U. S. Patent to Horace Freeman, No. 2,312,706, granted March 2, 1943, or otherwise as described below.

It will be understood that the barometric legs above referred to for maintaining the desired vacuum conditions in the system constitute a convenient inexpensive type of means for the purpose and that equivalents in the form of fan pumps and the like might be substituted, if preferred. Furthermore, as above indicated in connection with the discussion of the upper portion of Fig. 1, the discharge outlet as at 21 may be made with an expanding diameter, and in fact this outlet may be so formed as to expand to an extent such that it could discharge to atmospheric pressure, and in that event the vacuum pump used may be in the form of a water aspirator pump acting both as a vacuum pump and wash leg.

For the removal of dirt particles and the like as well as gas from suspensions such as of paper stock, it has been found that a bottom piece for the chamber 10a of the type shown in Fig. 7 is preferable and most efficient. This comprises a cup-like portion 60 detachably coupled at its upper end by flange means 61 to the lower end of chamber 10a. Within portion 60 a coaxial gas outlet pipe 62 is provided and preferably cast integrally with the portion 60, the lower end of the pipe 62 merging by a fillet-like portion 63, preferably of arcuate cross-section into the base portion 64. Coupling means 65 is provided on the underside of the base portion 64 for attachment to the pipe running to the vacuum pump. A small discharge outlet 66 for the rejected particles is provided, preferably through the wall of the cup-like portion 60 at the base thereof, this outlet preferably being arrange tangentially as indicated by dotted lines at 67, and pointed in a direction such that it will accept the swirl of rejected stock smoothly without causing any irregular deflection thereof.

The gas outlet pipe portion 62, as will be noted, extends up somewhat beyond the upper edge of the cup portion 60 and should be of a diameter somewhat less than the diameter of the evacuated core within the chamber 10a. Fig. 7 shows the preferred relative dimensions of the construction and is drawn to scale the same as Figs. 3–5. For highest efficiency in the separating of dirt particles, the inner wall surface of the cup portion 60 should be so designed as to smoothly and without irregular turbulence gradually crowd the downward liquid vortex inwardly toward the pipe portion 62 whereby more and more of the inner portions thereof which are then substantially free of dirt particles, will be caused to reverse their direction and pass helically upwardly. Meanwhile the outermost portions of the downward vortex will continue downwardly along the wall surface and carry therewith the dirt particles to the bottom 64 and out at 67, the final portions of the downward vortex which are not rejected being reversed to flow upwardly, by the curved fillet-like portion 63 on the base of the pipe 62.

Assuming that the chamber 10a has an internal diameter of 4 inches, and that the internal depth of the cup portion 60 is 7 inches, then the interior wall of the cup portion may start at the top with a 5° inward taper for a distance down of about one inch, then with a 4° taper for the next inch, and then with tapers of 3° and 2° respectively for the third and fourth inches down. Over the remaining lower 3 inches such taper is preferably about 1°. In case the member shown in Fig. 7 is used with a head piece as per Fig. 4, the gas outlet pipe may have an internal diameter of about ¾ inch and of a height of about 8½ inches, the dirt outlet 66 having an inside diameter of about ⅜ inch. With this preferred construction it is unnecessary to withdraw through the outlet 66 more than about 2% of the stock being treated in order to secure the highest degree of efficiency of dirt removal. A small fraction of 1% is sufficient for removal of substantially more than the majority of the dirt. At the same time more of the gas contained in the suspensions may be removed than has been found possible with the above-mentioned complicated and expensive equipment involving the boiling, impingement and vacuum treatment. The dirt separated includes not only grit, but also bark and resin particles and a substantial percentage of shives or small chips.

The apparatus also has the advantage that if it is desired to use same only for the removal of dirt, then the vacuum pump may be stopped or disconnected, whereupon the apparatus will still efficiently act to remove the dirt and chips while allowing the gas content of the pulp mixture to remain, as may be desired in making certain qualities of paper. The effects of removing and applying the vacuum connection to the equipment are strikingly noticeable on the treated stock. Stock treated with the vacuum connection operating and placed in a glass jar and observed even after a considerable time, appears uniform from top to bottom, whereas if the vacuum connection is not operating, the pulp in the resulting stock tends to flocculate to a considerable depth near the top of the body of the mixture, and the mixture will be covered by a layer of froth, substantially none of which is present on the degasified stock.

It should be noted that if it is desired to use the apparatus as shown in Fig. 2 for removal of no more than about 70% of the gases from the liquid mixture, then the shape of this chamber is relatively unimportant so long as it permits the treated liquid from chamber 10a to swirl about and then pass down through the barometric leg while any gases and vapors are withdrawn through the pipe 34, yet unless a higher percentage of the gases is withdrawn, there will be a tendency for some bubbles still to remain in the liquid as withdrawn from the chamber 10a, and these remaining bubbles may appear in the box below and give rise to a slight froth which after prolonged running may lead to the collection of pitch, particles of which will gather upon the bubbles. Also if such remaining bubbles are sufficient to cause froth to be drawn off through pipe 34, this may interfere with the maintenance of proper vacuum conditions in the system, or such froth may carry off enough fiber to require for economy a further recovery means. But we have found that these difficulties may all be avoided by making the chamber 33 of Fig. 2 of the shape shown more clearly in Fig. 8. That is, this chamber preferably is formed with two portions, the upper portion 70 being cylindrical and the lower portion 71 as a whole being shaped approximately like an upright funnel with its upper part more and more outwardly flared, or in other words the shape is generally similar to an elongated inverted cone, but with its side walls bulging inwardly as compared with the shape of a true cone. The theoretically ideal shape for the portion 71 is such that each vertical cross-section through its wall extends substantially along a certain logarithmic curve as hereinafter explained, but for manufacturing convenience and to readily permit flat sheet metal rolled to conical shape to be used, the portion 71 may be formed of four truncated conical parts 71a, 71b, 71c and 71d. For convenience in shipping and assembly, the parts 71b and 71c may be interconnected by suitable detachable flanges as at 72, whereas the other parts may be connected to each other as by welding. For example, the upper peripheral edge of part 71a is welded to the lower peripheral edge of part 70 and the lower peripheral edge of part 71a is welded to the upper peripheral edge of the part 71b. The lower end of part 71d preferably has a detachable flange connection as at 73 with the upper end of the discharge pipe or barometric leg 38. As shown, the incoming stock enters tangentially from the pipe 32 at a point near the lower part of chamber 70, the stock swirling around and acting to maintain a vortex layer as indicated on the inside surface of the portion 71. As shown, this vortex layer will surround an evacuated core which becomes smaller and smaller at its lower portions and disappears just above the upper end of the barometric leg.

The above-mentioned curve is indicated by line 75 in Fig. 8, this curve being preferably positioned intermediate the inner and outer surfaces of the vortex layer and being drawn to approximately obey the equation $$h = \frac{V^2}{g} \log_e \frac{r}{R}$$

wherein $h$ is the height of any point $p$ on the curve above the lower end of the gas core contained in the vortex; $V$ is the velocity of the liquid introduced into the chamber to establish the vortex; $g$ is the acceleration of gravity; $r$ is the radius of said point with respect to the axis of the vortex; and $R$ is the radius of the stream within the curve at the discharge pipe or barometric leg. This equation is based on the assumption that the velocity $V$ remains constant, which seems approximately true for practical purposes.

If it be assumed that the vortex were confined by a surface complying with this curve, then it can be shown mathematically and theoretically that the force applied to a particle at any point $p$ on the curve and tending to cause such particle to travel downwardly along such surface, will be equal to and counterbalanced by the force tending to cause the particle to travel upwardly along the confining surface. Also on any particle located in the vortex at a point inwardly of the point $p$, the force will be such as to tend to cause the particle to rise while, if the restriction of the chamber is such as to permit vortex particles to be located just outside the curve 75, the force thereon will be such as to cause them to descend. This may be explained further in connection with the diagram of Fig. 9, where a particle at point $p$ is indicated as subject to a centrifugal force horizontally and radially outwardly as indicated by the acceleration vector $$\frac{V^2}{r}$$

the same particle at the same time being subject to the vertically downward force of gravity as indicated by the acceleration vector $g$. In this diagram the angle at point $p$ of the assumed surface on which the particle is to travel with respect to the horizontal is indicated at $\alpha$. Thus upwardly in the direction along this surface, the particle will be subjected to a force indicated by the acceleration vector $$\frac{V^2}{r} \cos \alpha$$

and at the same time downwardly along the surface the particle will be subject to an equal and opposite downward force as indicated by the acceleration vector $g \sin \alpha$, and provided that said surface conforms to a curve obeying the above stated equation.

In view of the above facts, if the vortex layer is established and maintained in the lower chamber portion 71, partially inwardly and partially outwardly of the curve 75, then it will be apparent that the inner portions of the liquid or liquid mixture of the vortex (when $r$ is smaller) will tend to rise and be prevented by a force somewhat greater than $$m \frac{V^2}{r} \cos \alpha$$

from falling to the outlet at the bottom of the chamber. ($m$ represents the mass of the portion under consideration.) Meanwhile the portions of the vortex outside the curve 75 (where $r$ is larger) will be forced downwardly along the chamber wall by the action of a component of gravity. And since the vortex necessarily has a substantially angular velocity causing bubbles in the liquid to be subjected to centrifugal force, such bubbles will be promptly flung inwardly to the inner surface of the vortex which tends to rise, and thus such bubbles are kept from ever escaping at the bottom of the vortex. The same effect will occur not only on any small bubbles still remaining as such in the liquid as first introduced into this chamber, but since the vortex layer contains a core of gas constantly maintained at a low sub-atmospheric pressure, any gas that may still remain in the liquid in dissolved or occluded forms, will tend to form into bubbles which immediately migrate inwardly and upwardly to the evacuated core, with no danger that same will have a chance to again mix with the liquid and pass down out of the bottom outlet.

The chamber 33 is shown in Fig. 8 with its parts of the proper relative sizes and drawn to scale, assuming that the velocity of the introduced stream is equal to 7 feet per second and that the radius of the withdrawn stream at the bottom is 2 inches, the radius of the inlet stream being 1½ inches. A chamber of this size and shape is designed for use in a system such as of Fig. 2 in which a main separating chamber 10a is used with a 4-inch inside diameter as above described.

While as shown in Fig. 8, the wall of the chamber portion 71, including its parts where the sections are joined together, is all located just outside the curve 75, approximately equivalent results may be obtained by so positioning the tangential inlet that same will project the incoming stream slightly downwardly, as indicated by dotted lines at 32' and by then locating the wall of chamber portion 71 substantially at the curve 75 or even somewhat inwardly thereof, depending on the downward angle of the inlet 32'. This becomes possible because if the introduced liquid is given at the outset a slightly downward velocity component, then the force indicated by the above described acceleration vector $$\frac{V^2}{r} \cos \alpha$$

will be overcome in the outer portions of the vortex by reason of the downward velocity initially imparted, and even though the outer vortex portions are not outside the curve 75.

With the apparatus as shown in Fig. 2, including a chamber 33 shaped as shown in Fig. 8, it has been found that up to 90% of all the gas contained in typical paper pulp suspensions may be removed and by adjusting the degree of vacuum applied, various lesser percentages, if desired, may be removed. In the usual case it is believed that it is undesirable to remove more than 90% of the gas and in some cases not as much as such a percentage, since if a small amount of gas is allowed to remain, it appears to aid in maintaining the fibre in dispersed condition. That is, a small amount of remaining gas will tend to prevent the fibre from settling to the bottom of the liquid. Yet in the usual case it appears important to remove substantially all of the gas present in the form of bubbles, otherwise the pitch will tend to accumulate on the bubbles, but in the absence of such bubbles, the pitch will remain well dispersed and desirably contribute to the solids content of the suspension and need not be removed. The optimum percentage of gas removal may readily be determined by trial adjustments of the degree of vacuum with the above described apparatus.

The chamber as shown in Fig. 8, if desired, may be used effectively to separate gas from liquid or liquid suspensions independently of any preliminary separation of gas by the use of the separating chamber such as at 10a. Such a chamber is much more efficient for that purpose than would be a cylindrical chamber if a funnel-shaped gas core is to be maintained, because of the fact that the liquid of the vortex is maintained over a substantial area as a relatively thin layer, all the innermost portions of which have opportunity to be subjected to the sub-atmospheric pressure which, combined with the effect of centrifugal force is highly effective in expelling the gas in whatever form, from the liquid. On the other hand, if such a chamber were made cylindrical and with an inverted conical gas core or the like therein, it will be apparent that much of the liquid in such a cylindrical chamber would remain too far removed from the low pressure or evacuated core region to be effectively degasified.

Fig. 2 further illustrates one possible arrangement for secondary treatment of the rejected stock which contains dirt as discharged from the main separating chamber 10a. That is, a small secondary vortex separator as at 80 may be connected to receive the rejected stock at a point near the lower end of of the pipe 54. The separator 80 may be similar to the chamber 10a in construction and operation, although in the usual case it will be unnecessary to maintain an evacuated core therein. That is, the pipe 54 may be connected to project the dirt-bearing stock tangentially into a headpiece at 81 similar to but smaller than the above-described headpiece 11a, and which has an axial clean stock discharge outlet 82 connected to a pipe 83 running to the box 40. The small portion of the suspension which is rejected with the dirt from separator chamber 80 may be discharged tangentially through pipe 83 and an adjustable outlet valve 84.

With the secondary separator 80 connected in the position here shown, it will be unnecessary to provide any pump for supplying the stock thereto, since the rejected stock as discharged from the chamber 10a will be at a pressure for example of about 5 pounds per square inch and this, supplemented by the additional pressure due to the height of the column of suspension in the pipe 54, will be ample for supplying the necessary intake pressure to the headpiece 81.

Fig. 10 shows by way of example, at 33a, another embodiment of the chamber construction similar to that shown in Fig. 8, but of larger size, adapted for use in a system having a main separating chamber as at 10a of a diameter of 10 inches. In order that the slope of the wall of the lower portion of the larger sized chamber 33a will more closely correspond to the theoretically ideal curvature, this portion as indicated may be formed of a larger number of truncated conical parts each rolled to conical shape from flat sheet metal and joined together as by welding along lines indicated at 90 or by detachable flanges as at 91. This chamber, as shown in Fig. 10, is drawn to scale with proper relative dimensions, assuming that the inlet opening at 32a has a radius of 4 inches and the outlet opening 38a a radius of 5 inches.

With a main separating chamber such as at 10a but of a diameter of 10 inches, the bottom portion thereof might preferably be constructed as shown in Figs. 12 and 13. Here the cup portion 60a for convenience in machining is preferably made separate from its bottom portion 64a, the two parts being detachably connected by bolted flanges as at 92. Here the gas outlet pipe 62a preferably is formed with a restricted inlet portion 93 at its upper end so that the external diameter of its upper end will be small enough to be located inside any layer of froth or bubbles which may occur around on the inner surface of the liquid vortex. The fillet-like portion 67a around the bottom of the pipe portion 62a is preferably made smaller than the corresponding portion of Fig. 7, and in fact if desired this fillet may be omitted. In other respects the construction of the parts of Figs. 12 and 13 may be similar in principle to the corresponding features of the bottom piece of Fig. 7, the corresponding portions of Figs. 12 and 13 corresponding to those of Fig. 7, being identified by the same reference numerals accompanied by the letter a. The dimensions of the parts of Figs. 12 and 13 are also drawn to scale, assuming that the internal diameter of the cylindrical chamber 10b is 10 inches.

This application comprises a continuation-in-part of our copending U. S. application Serial No. 314,248, filed October 11, 1952, and now abandoned in favor of the present application.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In combination with a vortex type separator chamber of circular internal cross-section having at one end a concentric outlet for the treated material and a tangential inlet for causing a helical flow of the material to be treated from such inlet to the other end of the chamber, such flow then reversing as an inner vortex returning to said outlet, a closure for such other end of said chamber comprising a cup having its rim sealed with respect to the end edges of the chamber, the inner wall surfaces of said cup, starting at the rim being tapered inwardly and toward the bottom of the cup at an angle of several degrees, such angle diminishing to a smaller angle nearer the bottom of the cup, a tangential outlet for separating the solid particles extending through the wall adjacent the bottom of the cup, and a concentric gas outlet pipe extending up through the bottom of the cup and for a short distance into said chamber, said pipe adjacent the bottom of the cup merging with the inside bottom surface of the cup with a curved fillet-like formation.

2. Method for treating fibrous pulp suspensions to remove dissolved gas, bubbles and undesired solid particles, which comprises: so injecting a supply of the suspension into an elongated chamber of circular cross-section as to cause a helical flow of the suspension of substantial thickness along on the inside walls of the chamber; maintaining a central core region in said chamber at a sub-atmospheric pressure sufficiently low to cause the dissolved gas to be liberated from such flow, such injection being maintained at a sufficient velocity whereby said core remains free of liquid and the resulting centrifugal force causes such particles to accumulate in the outer part of the helical flow and forces the bubbles of gas in or liberated from the suspension into said core; and withdrawing from the chamber the desired treated suspension at a point after same has followed a helical path of substantial length, while constantly evacuating gas from said core region at the end thereof opposite the end of the chamber at which the treated suspension is withdrawn to maintain said low pressure in the core, and while also separately from the withdrawal of the treated suspension, discharging from said helical flow after it has followed a helical path of substantial length, a small part of the suspension containing such accumulated particles.

3. Method for treating fibrous pulp suspensions to remove dissolved and occluded gas, bubbles and undesired solid particles, which comprises: tangentially injecting a supply of the suspension into an elongated chamber of circular cross-section to cause a helical flow of the suspension of substantial thickness along on the inside walls of the chamber and extending from the point of injection near one end of the chamber to the other end of the chamber and there reversing as an inner helical flow extending back to the first end of the chamber; maintaining a central gas core region in said chamber of subatmospheric pressure sufficiently low to cause the dissolved and occluded gas to be liberated from such reversed inner flow into said core, such injection being maintained at a sufficient velocity whereby said core remains substantially free of liquid and the resulting centrifugal force causes such particles to accumulate in the outer part of the outer helical flow and forces the bubbles and gas as liberated from the suspension into said core; withdrawing from the chamber at the first end thereof said reversed inner helical flow comprising the desired treated suspension while constantly evacuating gas from said core at said other end of the chamber to maintain said low pressure in the core and while also separately from said withdrawn treated suspension discharging from the helical flow adjacent said other end of the chamber a small part of the suspension containing such accumulated particles.

4. Apparatus for separating dirt particles, dissolved and occluded gases and gas bubbles from fibrous pulp suspensions and the like, comprising: an elongated chamber having a body portion of circular internal cross-section; a liquid inlet connection which is nozzle-shaped and positioned to discharge the liquid under pressure at high velocity generally tangentially into one end of said body portion for maintaining a helical flow of the suspension about the inside walls of said chamber and containing a central gas core; a liquid outlet concentric with, and at said end of said chamber and adapted to permit discharge therefrom of the greater portion of said helical flow after same has extended to the other end of the chamber and been reversed and returned as an inner vortex containing the gas core and extending to said first end of the chamber; other outlet means at said other end of the chamber for evacuating gas from said core and for discharging a small portion of the suspension containing said dirt particles accumulated in the peripheral portions of the helical flow; means for maintaining a vacuum for evacuating said gas core; and means for bringing said vacuum-maintaining means into direct unobstructed communication through said other outlet means with the end of the gas core at said other end of the chamber.

5. Method for separating gas in the form of bubbles and dissolved gas from a stream of liquid which comprises: introducing such stream tangentially at an intermediate point into the side of an upstanding chamber of circular cross-section at a velocity V to maintain a liquid vortex in the chamber surrounding a gas core while continuously evacuating gas at subatmospheric pressure from within the upper end of such core and continuously withdrawing liquid by suction from the lower end only of said vortex; confining the portion of said vortex above the point of introduction of the stream to a generally cylindrical shape; and confining substantially the vortex portion between the point of introduction of the stream and said lower end to a shape such that each vertical cross-section of the outer portions thereof will extend approximately along a curve conforming to the equation $$h = \frac{V^2}{g} \log_e \frac{r}{R}$$

where $h$ is the height of any point on the curve above said lower end of the vortex; V is the aforesaid velocity of the introduced liquid; $g$ is the acceleration of gravity; $r$ is the distance between said point and the axis of the vortex; and R is the value of $r$ at said lower end of the vortex, the vortex being so confined that said core becomes gradually smaller in its lower portions, and bubbles of gas in or liberated from the liquid of the vortex are thrown inwardly to said core while the inner portions of the vortex including such bubbles tend to rise and are prevented by an upward component of the centrifugal force of the vortex from directly falling to said lower end, and while the outer portions of the vortex fall to said lower end by the action of a gravity component.

References Cited in the file of this patent

UNITED STATES PATENTS

| | | |
|---|---|---|
| 960,725 | Snyder | June 7, 1910 |
| 1,570,040 | Chandler | Jan. 19, 1926 |
| 1,766,666 | Meyer | June 24, 1930 |
| 2,098,608 | Berges | Nov. 9, 1937 |
| 2,102,525 | Freeman | Dec. 14, 1937 |
| 2,187,646 | Darrieus | Jan. 16, 1940 |
| 2,312,706 | Freeman | Mar. 2, 1943 |
| 2,346,005 | Bryson | Apr. 4, 1944 |
| 2,377,524 | Samson et al. | June 5, 1945 |
| 2,571,219 | De Cew | Oct. 16, 1951 |
| 2,642,950 | Clark et al. | June 23, 1953 |
| 2,645,347 | Baxter | July 14, 1953 |
| 2,648,433 | Wright et al. | Aug. 11, 1953 |
| 2,685,937 | Clark et al. | Aug. 10, 1954 |
| 2,737,857 | Lee | Mar. 13, 1956 |